(12) United States Patent
Breton et al.

(10) Patent No.: US 11,882,506 B2
(45) Date of Patent: *Jan. 23, 2024

(54) METHOD FOR COLLECTING DATA IN A NETWORK, SENSOR, CONSUMPTION METER, DATA COLLECTOR AND NETWORK

(71) Applicants: Diehl Metering Systems GmbH, Nuremberg (DE); Diehl Metering S.A.S., Saint Louis (FR)

(72) Inventors: Aster Breton, Saint Veran (FR); Guy Bach, Waldighofen (FR); Christoph Sosna, Nuremberg (DE); Klaus Gottschalk, Winkelhaid (DE); Achim Schmidt, Weissenohe (DE); Thomas Kauppert, Nuremberg (DE); Petra Joppich-Dohlus, Rathsberg (DE); Stefan Schmitz, Nuremberg (DE)

(73) Assignees: Diehl Metering Systems GmbH, Nuremberg (DE); Diehl Metering S.A.S., Saint Louis (FR)

( * ) Notice: Subject to any disclaimer, the term of this patent is extended or adjusted under 35 U.S.C. 154(b) by 393 days.

This patent is subject to a terminal disclaimer.

(21) Appl. No.: 17/346,445

(22) Filed: Jun. 14, 2021

(65) Prior Publication Data
US 2021/0306821 A1    Sep. 30, 2021

Related U.S. Application Data

(63) Continuation of application No. PCT/EP2018/084972, filed on Dec. 14, 2018.

(51) Int. Cl.
*H04W 4/38* (2018.01)
*H04W 4/35* (2018.01)
(Continued)

(52) U.S. Cl.
CPC ............ *H04W 4/38* (2018.02); *H04L 1/1678* (2013.01); *H04L 1/1819* (2013.01); *H04W 4/35* (2018.02); *H04W 24/08* (2013.01)

(58) Field of Classification Search
CPC ......... H04W 4/38; H04W 4/35; H04W 24/08; H04L 1/1678; H04L 1/1819;
(Continued)

(56) References Cited

U.S. PATENT DOCUMENTS

| | | | | |
|---|---|---|---|---|
| 8,560,256 B2 * | 10/2013 | Gu | ....................... | G01R 15/202 |
| | | | | 702/183 |
| 10,302,454 B2 * | 5/2019 | Mackie | ..................... | G01F 1/60 |
| 2007/0124109 A1 | 5/2007 | Timko et al. | | |

FOREIGN PATENT DOCUMENTS

| | | |
|---|---|---|
| WO | 2015148274 A1 | 10/2015 |
| WO | 2017004182 A1 | 1/2017 |

* cited by examiner

*Primary Examiner* — Hai Phan
*Assistant Examiner* — Anthony D Afrifa-Kyei
(74) *Attorney, Agent, or Firm* — Laurence A. Greenberg; Werner H. Stemer; Ralph E. Locher

(57) ABSTRACT

A method collects data in a network by operation of a local sensor of a consumption meter where the network is part of a supply network. The network distributes a consumable good. The sensor has a measuring element providing raw measurement data corresponding to a physical or physico-chemical value or parameter. The sensor has a wired and/or radio communication device and a memory. For the determination of the measurement resolution of the sensor the conditions for generating time stampings using a correlation model are determined in advance, on the basis of the correlation model time stampings of successive raw measurement data in the sensor are generated. The time stampings are transmitted over a wired connection and/or a radio link so that on the basis of the time stampings using the (Continued)

correlation model the raw measurement data collected by the measuring element are reconstructed and evaluated and used for network monitoring.

35 Claims, 11 Drawing Sheets

(51) Int. Cl.
*H04L 1/1607* (2023.01)
*H04L 1/1812* (2023.01)
*H04W 24/08* (2009.01)

(58) Field of Classification Search
CPC .... G05B 19/0428; G05B 19/00; G05B 19/02; G05B 19/04; G05B 19/042; G05B 2219/2612; G01D 21/00; G01D 21/02; G01D 4/002; G01D 9/005; G06Q 50/06; G07F 15/00; H04Q 9/00; H04Q 9/02; H04Q 2209/40; H04Q 2209/60; H04Q 2213/1313; Y04S 20/30
See application file for complete search history.

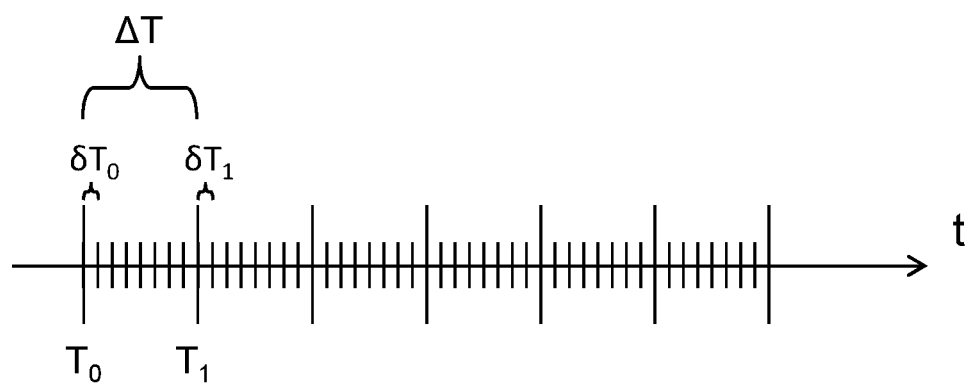
FIG. 6
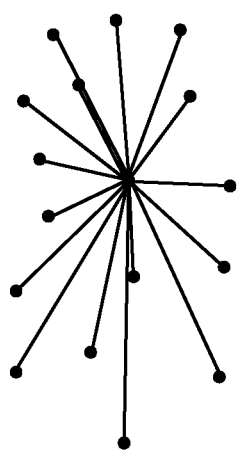 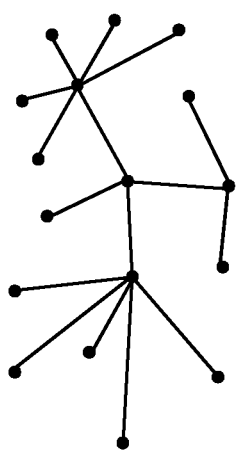 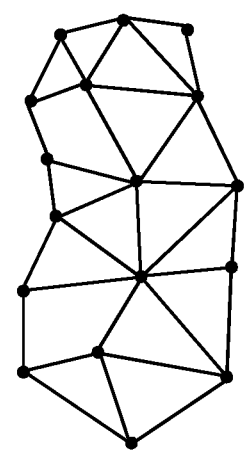
FIG. 7A     FIG. 7B     FIG. 7C

METHOD FOR COLLECTING DATA IN A NETWORK, SENSOR, CONSUMPTION METER, DATA COLLECTOR AND NETWORK

CROSS-REFERENCE TO RELATED APPLICATION

This application is a continuation, under 35 U.S.C. § 120, of copending international application No. PCT/EP2018/084972, filed Dec. 14, 2018, which designated the United States; the prior application is herewith incorporated by reference in its entirety.

BACKGROUND OF THE INVENTION

Field of the Invention

This invention describes a method for collecting data according to the independent method claim, a sensor according to the independent sensor claim, a consumption meter according to the independent consumption meter claim, a data collector according to the independent data collector claim and a network according to the independent network claim.

Consumption meters are part of supply networks for the distribution of consumable goods, such as gas, water, heat or electricity, and are used to generate consumption data. On the basis of raw measurement data provided by a measuring element of a sensor, consumption data is calculated by a microprocessor on the meter side and forwarded to a central data management system (head-end system) via a communication system in the form of a BUS system, in particular a so-called M-BUS system. The data are mainly the current consumption measured by the consumption meters, i.e. the meter status.

Raw measurement data is generated by the measuring element of a sensor of the consumption meter at predetermined times, evaluated by a microprocessor of the consumption meter, i.e. converted into consumption data, and the resulting metering data is then requested by a reading or receiving device (M-BUS master or concentrator or data collector) via a primary communication path at predefined times at the individual locally arranged consumption meter. These metering data are then transmitted from the reading or receiving device via a tertiary communication link, for example based on LAN, GPRS, 3G, LTE, to a head-end system. The consumption data can then be displayed in the head-end or used for invoicing. The existing concept of consumption data acquisition is limited both in its depth of information and in its scope of information.

BRIEF SUMMARY OF THE INVENTION

The aim of the present invention is to provide a generic procedure in a network for collecting and/or forwarding data and the sensors, consumption meters, data collectors as well as the network to be used for this purpose, each with increased information content.

The aim is achieved by the characteristics of the independent method claim, by a sensor according to the independent sensor claim, a consumption meter according to the independent consumption meter claim, a data collector according to the independent data collector claim and a network according to the independent network claim.

This invention describes a method for collecting data in a network, preferably data in connection with a consumption, a physical or physicochemical parameter and/or an operating state in the context of an operation of a local sensor, preferably a sensor for a consumption meter as part of a supply network containing at least one local sensor, preferably a plurality of local sensors for the distribution of a consumable good, with a plurality of sensors, whereas the sensor contains at least one measuring element. The measuring element of the respective sensor provides elementary measuring units in the form of raw measurement data which corresponds to at least one physical or physicochemical value or at least one physical or physicochemical parameter. The sensor contains wired and/or radio communication means and memory means. Wherein for the determination of the measurement resolution of the sensor the conditions for generating time stampings using a correlation model are determined in advance, on the basis of the correlation model time stampings of successive raw measurement data in the sensor are generated. The time stampings are stored in the memory means of the consumption meter, the time stampings are transmitted over a wired connection and/or a radio link so that on the basis of the time stampings using the correlation model the raw measurement data collected by the measuring element are reconstructed and evaluated. Whereas the raw measurement data are used for network monitoring.

In accordance with the invention, for determining the measurement resolution of the sensor the conditions for generating of time stampings using a correlation model are determined beforehand. On the basis of the correlation model time stampings of successive raw measurement data are generated in the sensor and stored in the memory means. Subsequently only the time stampings corresponding to the recorded raw measurement data are transmitted, so that on the basis of the time stampings using the correlation model the recorded raw measurement data can be reconstructed and evaluated after successful transmission. This eliminates the need for computing-intensive and therefore energy-intensive computing operations in the area of the local sensor. Computing-intensive and energy-intensive computing operations can be relocated into the area of a data collector or a head end. The invention-based method makes it possible to provide time stampings of raw measurement data in a continuous, complete and consistent time context, especially without gaps in the area of a remote central processing facility or a head end system. The raw measurement data reconstructed by the time stampings can be continuously assigned to the time axis, i.e. they represent a real time course that excludes discontinuous gaps or data lapses. The continuous, time-stamped raw measurement data stream generated according to the inventive method has a much higher resolution over the continuous time axis compared to existing solutions. The invention therefore enables, in addition for example a consumption calculation, a much larger number of calculations and/or determinations and/or additional features such as functions including "business" functions, for example in the head-end system, than was previously possible. The inventive procedure also makes it possible to determine the condition of a supply network. This enables the provider to offer the customer of a supply network much greater transparency than before. Due to the ingenious method, the design of the sensor can also be much simpler and more cost-effective, since complex microprocessors for calculations, e.g. for calculating the flow rate, are no longer required. Due to the recorded temporal correlation of the raw measurement data, manipulations can be avoided, since the measurement results can be compared with empirical values over the entire time axis. Furthermore, due to the elimination of energy-intensive computing power, the energy consumption of the module consisting of a sensor and time stamping processing or communication equipment is considerably lower than with previous versions, which evaluate the data locally at the consumption meter. The time stampings may be points in time or time differences. The points in time or time differences may be actual time data or real time data or at least be oriented towards it. The time differences may be formed from time stamping to time stamping or from a predefined point in time.

The network may be, for example, an electrical, gas or water network with modules or consumption meters generating and/or using raw measurement data, which are located at each endpoint of the network. Furthermore, the network may be configured as a smart grid.

It is advisable for the local sensors and/or consumption meter(s) to be connected to the data collector via a primary communication path, for a tertiary communication path to be provided between the data collector and a head end, and for the time stampings transmitted by sensors and/or consumption meters to be collected, stored and/or evaluated in the data collector and/or the head end. The transmission of the time stampings over the primary and tertiary communication path enables a significant higher number of calculations and/or findings and/or functions including "business"-functions to be carried out in the head end, where sufficient computing power is available.

Within the framework of the correlation model a certain value, a certain change in value or a certain difference in value of the at least one physical or physicochemical value or at least one physical or physicochemical parameter may be determined for the assignment of a time stamping, whereas on recording the certain value, the certain change in value or the certain difference in value by the measuring element a time stamping is triggered and stored in the memory means of the sensor, where it is provided for transmission. If the value detected by the sensor does not change no time stamping is generated. Thus, typically for the method according to the invention, longer periods can elapse without time stampings. This means that data does not have to be transferred all the time. Nevertheless, the method has a very good resolution.

Especially within the framework of the correlation model a stepwise or incremental increasing meter reading and/or a table of values may be represented by time stampings.

Preferably the time stampings have a sign, for example a plus or minus sign. This is particularly advantageous when mapping a value table, as it determines whether the concrete time stamping affects an ascending or descending value in the value table.

It is particularly useful that for reconstructing and evaluating the raw measurement data collected by the measuring element a basic index of the sensor and time stampings indicating an incremental increase and/or decrease of the index are transmitted. In order to obtain the consumption data, the base index is used and the index is adjusted according to the time stampings transferred. The base index can therefore be used as a reference value for the following time stampings.

According to the invention, a number of time stampings may be transmitted over the primary communication path as a data packet or as a data telegram.

The elementary measuring units may refer to the electric voltage or to the electric current. For example, the output voltage of a Hall sensor can be measured in case of its excitation or the voltage of a temperature sensor.

The advantage is that network monitoring can take place during live operation, preferably in real time. The raw measurement data reconstructed by the time stampings can thus be used for network monitoring in an intelligent network (smart grid). Real-time network monitoring makes it possible, for example, to adapt the network to current consumption. Moreover network monitoring may comprise load-dependent network restructuring. The load on the network, e.g. between points A and B, can thus be easily determined so that the flow rate in the network can be adjusted accordingly. Furthermore, parts or sections of the network can be identified which are less or least efficient, so that countermeasures can be taken early on, even before there is an undersupply or similar in these areas. For example, in a water supply network, consumption may increase and/or decrease randomly in parts of the network. This has the advantage that fluctuations in the supply and/or impending supply gaps can be detected quickly and easily and corresponding countermeasures can be initiated.

It is particularly useful that a consumption signature is determined for the individual sensor and/or the individual consumption meter of the plurality of sensors and/or consumption meters. For each sensor and/or consumption meter in the network a consumption signature can be determined, so that the individual sensor and/or the individual consumption meter can be clearly identified and addressed network-wide. The advantage is that the individual signature is used to identify a potential metering failure. This makes it quick and easy to identify a potentially error-prone or failing sensor and/or consumption meter. As soon as, for example, the signature deviates from the known signature of a sensor and/or consumption meter, a change can easily be detected, which indicates a possible problem in the network, such as the occurrence of a leak.

It is possible that a configuration of a sensor and/or a consumption meter and/or a line section is determined based on the current consumption in the network. For this purpose, fluctuations or deviations can be registered and observed in the network, for example, in order to determine badly configured sensor and/or consumption meters and/or line sections. This can be done based on the principle of random consumption. For example, due to pipes, pipe fittings and seals, the total amount of water in a water network can more or less increase or decrease, which means that the entire system no longer has a constant or fixed volume. This invention makes it possible, particularly by using the raw measurement data reconstructed from time stampings, to track the actual consumption, especially the water consumption, due to the high temporal accuracy.

A sensor and/or consumption meter consumption profile analysis can be performed for diagnosis of the network. The raw measurement data stream of the sensor and/or consumption meter can be used to create a consumption profile of the sensor and/or consumption meter. The sensor and/or consumption meter consumption profile is analyzed to get a diagnosis of the network. For example, leakages could be identified or the type of consumer downstream of the sensor and/or the consumption meter can be determined. The network may also perform a self-diagnosis. The average of the network sensor and/or consumption meter consumption profiles can be used to determine and evaluate overall network efficiency.

It is advantageous to take a snapshot of the network at time $T_0$ to determine the current meter reading of the sensors. The snapshot of the network can include, for example, the inflows and outflows to and from the network. Sensors and/or consumption meters may be attached to the outflows in a water network, for example. Leakages and/or fluctuations, such as pressure fluctuations, can also occur in the network. In addition, storage tanks, such as a water storage tank, can be provided in the network.

It is useful to take a snapshot of the network at time $T_1$ to determine the consumption in the time interval from time $T_0$ to time $T_1$. For example, consumption in a water network can be expressed in volume. Thus, the consumption in the network can be determined in a simple way by snapshots at different times $T_0$ and $T_1$. The continuity equation for the network is given as $\partial \phi/\partial t + \nabla \cdot (\phi V) = S$. Consumption can therefore be determined on the basis of the instantaneous consumption of the individual components or consumers in the network at a certain time. By taking snapshots on a regular basis, leaks or other problems in the network can be quickly detected and identified. For this purpose, a program can be automatically executed on a server at regular intervals. This means that even unforeseeable events can be detected quickly and easily.

To calculate the time derivative of the current consumption, it is advantageous to use a consumption value reconstructed from time stampings that is infinitesimal in time before the current consumption value. The continuous raw measurement data stream through the sensor and/or consumption meter allows several snapshots of the network to be taken at infinitesimal time intervals. This makes it possible to calculate a time derivative of the current consumption.

It is possible that the time derivative of the current consumption value is formed to extrapolate the consumption of a sensor and/or a consumption meter. The time derivation of the current consumption is required for the time extrapolation of the current consumption. The time extrapolation of the current consumption can be determined for an endpoint of the network, such as a sensor and/or a consumption meter. If the time intervals between snapshots of the network are not sufficiently small, as is the case with the current state of the art, errors may occur in determining the time derivative and thus in extrapolation.

Network monitoring and evaluation of the data can conveniently take place in a remote central processing facility. Network communication as well as data processing and evaluation can therefore take place on a server, for example.

In addition to its temporal resolution (sampling rate or multiple of the sampling rate), the raw measurement data stream can preferably be evaluated at any time on a time-historical basis without gaps. This results in the advantage that, for example, status changes in the supply network (e.g. overflow, underflow, leaks, manipulation attempts, etc.) that occurred in the past can also be determined or documented in precise time allocation and without gaps. Furthermore, it is possible to display past consumption data much more precisely to the consumer and/or to better include them in evaluations with regard to consumption behavior or changes to the same. This in turn has a consumption-optimizing effect and represents particularly important information for the consumer from the network or grid supplier.

The successive raw measurement data concerned are in particular not calculations and/or evaluations but elementary measurement units.

Ideally, the or one of the measured physical quantity(s) may relate to a flow medium, each time-stamped elementary measuring unit corresponding to an elementary fluid quantity measured by the measuring element of the respective sensor on the basis of its measuring accuracy.

It is appropriate that the measured physical or chemical-physical parameter(s) triggering time stampings may characterize the quality and/or composition of a fluid flowing through or contacted by the sensor concerned, such as turbidity, the presence of pollutants or the presence of a solid and/or gaseous fraction or solid and/or gaseous fractions.

It is possible that the raw measurement data stream has a temporal resolution which is determined or conditioned by the sensor sampling rate or measuring element sampling rate or a multiple thereof. The raw measurement data stream has a time resolution which is only determined or at least conditioned by the sensor sampling rate or measuring element sampling rate or a multiple thereof. The temporal resolution of the raw measurement data stream is preferably in the second range, tenth of a second range, hundredth of a second range or thousandth of a second range.

Advantageously, the raw measurement data stream is continuous and/or complete on the basis of the determined resolution. This results in a particularly high resolution of measured values along the continuous course of time and from this in turn a special depth of information as a basis for evaluations and calculations based on it.

In order to generate the continuous raw measurement data stream, the data packets are usefully combined in a corresponding time sequence reference or at least put in relation to each other, so that the time stampings contained in the packets are later combined again along the real time axis according to their sampling and previous packet division or at least set in a continuous time relationship to each other.

The decision when a new data transmission in the form of a message or a telegram (of one or more data packets) is to be carried out depends preferably on whether at least one of the two conditions:
  (a) expiration of a specified time interval, and
  (b) achieving a specified amount of time stampings since the previous transmission is fulfilled. As a result, a time sequence reference of the data packets to be transmitted can be easily implemented.

It is particularly useful that the method includes packaging the time stampings by formatting it into data packets of a predetermined fixed size, with a new transmission being triggered each time the accumulated data reaches the size of a data packet or the predetermined time interval has expired.

It is possible that the data transmission is carried out with redundancy. It is useful to achieve redundancy in transmission by sending the same data packet or time stamping repeatedly in several successive transmissions.

Advantageously, the time stampings can be compressed and the time stampings can be compressed without loss. The time stampings can be compressed without loss in the area of the sensor. The transmission of the time stampings can usefully take place in compressed form via a wired link and/or via a radio link. Transmission can be repeated and conditional upon expiration of a specified time interval and/or upon reaching a specified amount of time stampings collected since a previous transmission. Thus, for example, equidistant time stampings can be determined for their transfer in a simplified manner using the method according to the invention.

Alternatively, compression of the time stampings can also be carried out with a specified, permissible loss level. If the time stamping compression is performed at a specified permissible loss level, if the user or operator prefers to save energy and accepts some inaccuracy in the restoration and reproduction of the original measurement data (i.e. accepts some loss), the compression ratio may be increased to the detriment of less accuracy in the reproduction on the receiver side. The loss ratio or compression ratio can be provided as a programmable or adjustable parameter that determines or sets the compression mode.

As illustrative and non-restrictive examples of data compression algorithms, a differential compression (delta coding) in connection with a Huffman coding, a run length coding (RLE coding) or preferably an adaptive binary arithmetic coding (CABAC coding) can be considered within the framework of the inventive method.

In addition, this invention claims a sensor. The sensor can advantageously be operated according to a method according to at least one of the method claims.

In addition, this invention claims a consumption meter. The consumption meter can advantageously be operated according to a method according to at least one of the method claims.

Furthermore, the present invention claims a data collector. The data collector can advantageously be operated according to a method according to at least one of the method claims.

The present invention also claims a network. Data in the network can be collected according to a method in accordance with at least one of the method claims. Furthermore, the raw measurement data reconstructed from time stampings are used for network monitoring.

Other features which are considered as characteristic for the invention are set forth in the appended claims.

Although the invention is illustrated and described herein as embodied in a method for collecting data in a network, a sensor, a consumption meter, a data collector and a network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is an example for the different time scales $\Delta T$ and $\partial T$;

FIGS. 7A-C are simplified examples for centralized, decentralized and distributed networks;

DETAILED DESCRIPTION OF THE INVENTION

Figure 1:
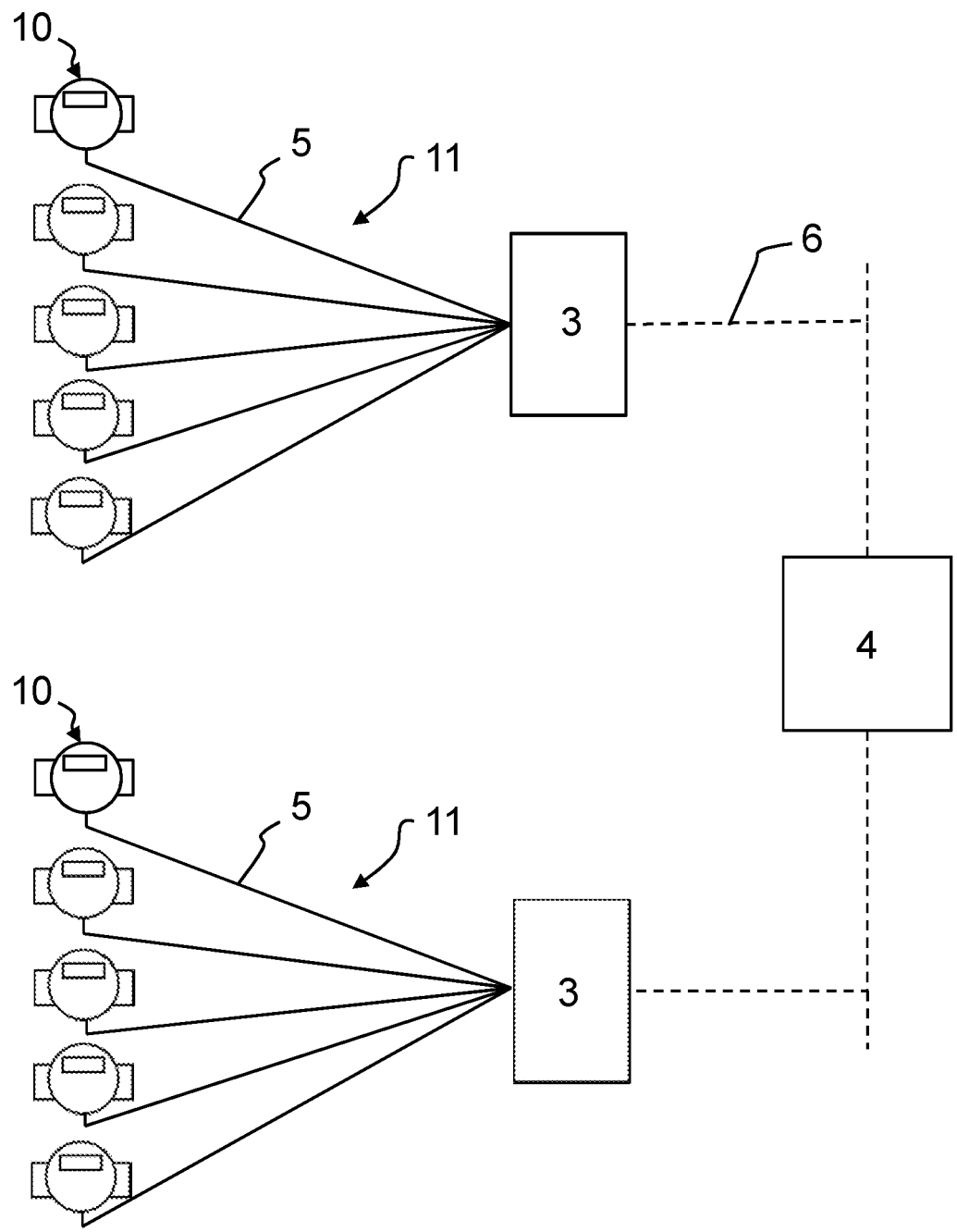
FIG. 1 is a very simplified schematic representation of an example of communication links in a supply network for collecting and/or forwarding data collected by a large number of consumption meters to a data collector and a head-end.

Referring now to the figures of the drawings in detail and first, particularly to FIG. 1 thereof, there is shown a supply network for the distribution of consumable goods or consumables, e.g. gas, water, electricity, fuel or heat. The supply network contains a large number of individual local consumption meters, which can, for example, be assigned to different residential units of an apartment building. The individual consumption meters 10, e.g. water meter, heat meter, electricity meter or gas meter, are connected via a wireless communication link to a data collector 3, which can function as master or concentrator.

The respective data collector 3 is connected to a so-called head-end 4 via a tertiary communication path 6. The data of the entire supply network is collected in the head-end 4. The tertiary communication link 6 can be a wired communication link or a communication link based on radio technology (e.g. mobile radio communication link). Alternatively, the data of the respective data collector 3 can also be read out by a portable reading device if required and read in again at the head end 4. The data can be transmitted along the tertiary communication path 6 in different ways, for example via LAN, GPRS, LTE, 3G, etc. The entire network may be configured as a smart grid. Smart grids combine generation, storage and consumption, whereas a central control system coordinates them optimally to each other.

The individual consumption meters 10 can be operated with an independent power supply (rechargeable battery).

Figure 2:
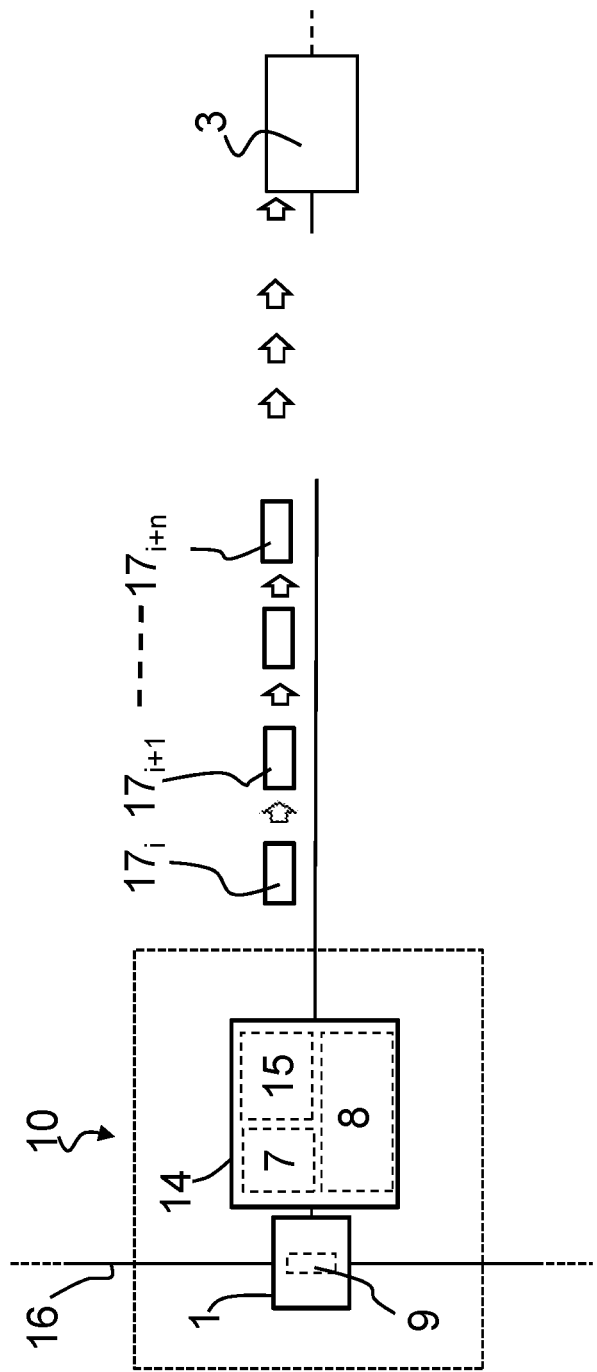
FIG. 2 is a simplified schematic representation of an example of the transmission of raw measurement data of characteristic time stampings via the primary communication path from FIG. 1 to the data collector.

According to FIG. 2, the respective consumption meter 10 contains a sensor 1 equipped with at least one measuring element 9. The sensor 1 is to be used to generate raw measuring data via the measuring element 9, which are fed to a measuring data processing unit 14. The raw measurement data correspond to elementary measuring units supplied by measuring element 9 of at least one physical or physicochemical quantity or of at least one physical or physicochemical parameter. The raw measurement data can, for example, be raw data in connection with the flow of a medium through a supply line 16, e.g. water pipe, in particular the flow rate, turbidity, the presence of pollutants or the presence of a solid and/or gaseous component or solid and/or gaseous components.

The measurement data processing unit 14 of the consumption meter 10 contains memory means 7, a time reference device 15 (quartz) and a microprocessor 8. The aforementioned components can be provided separately or as integrated total components.

According to the invention, the following subsequent steps are carried out in the area of the respective consumption meter 10:

Triggering a time stamping TS when one physical or physicochemical value or at least one physical or physicochemical parameter is recorded.

Storage of the time stampings TS in the memory means 7 of the sensor 1 and/or the consumption meter 10.

Transmission of the time stampings TS, preferably in compressed form, over a radio link 11 by preparing data telegrams 17$i$, 17$i$+1, 17$i$+n in the measurement data processing unit 14, which are successively transmitted to a remote central processing facility 12, e.g. a head end 4. The compression of the time stampings TS is performed by the microprocessor 8.

Accordingly, data telegrams 17$i$, 17$i$+1, ..., 17$i$+n are transmitted in sequence, which contain continuous time stampings TS. From these time stampings TS a continuous uninterrupted raw measurement data stream 13 of very high resolution can be reconstructed on the receiver side using the correlation model.

Figure 3:
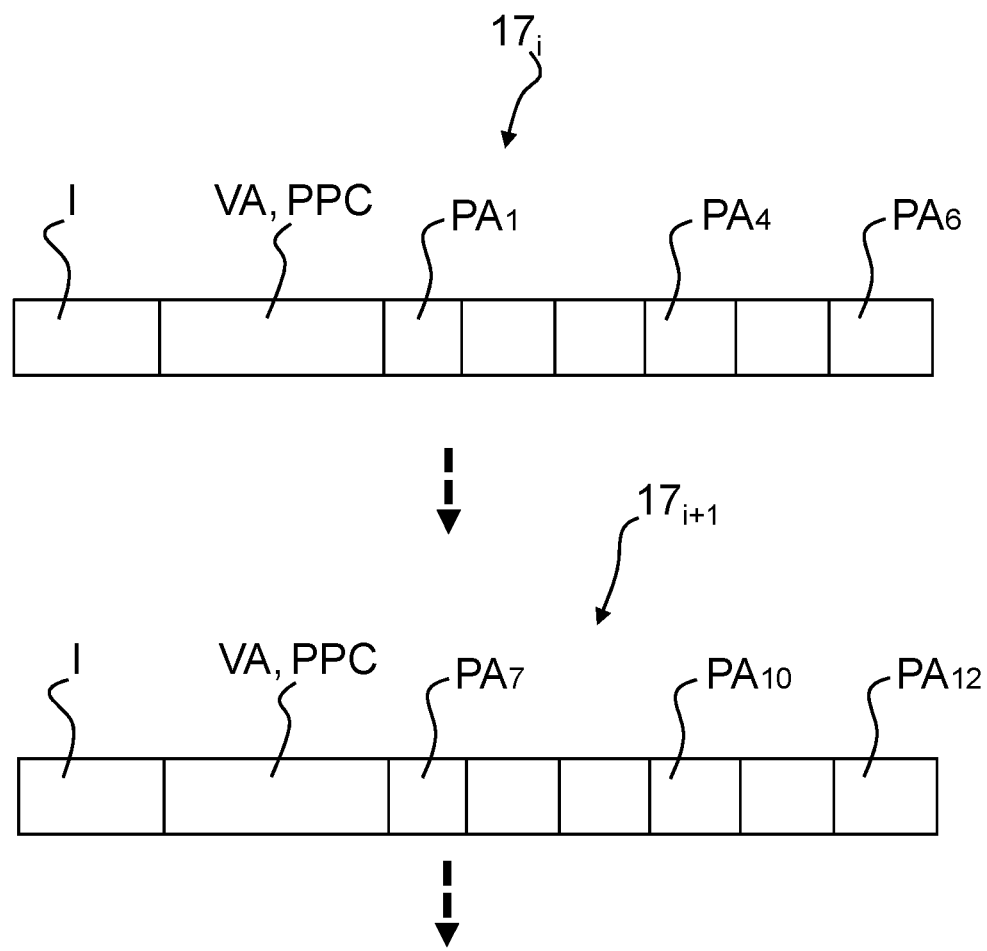
FIG. 3 is an example of a message structure which is emitted or queried by the processing unit for measured data of the consumption meter according to FIG. 2 via the primary communication link.

As shown as an example in FIG. 3, the identity (address) I of the respective sensor 1 and/or the absolute or cumulative value VA of the physical or physicochemical quantity or parameter measured by the respective sensor 1 in the respective data telegram 17$i$, 17$i$+1, ..., 17$i$+n can be transmitted together with the PA$j$ packets of the time stampings TS, whereby the value VA can be provided with a time stamp or assigned to one of the elementary time-stamped measurement data, for example an index value of a fluid meter. The value VA can be—according to the example—for example, the meter reading of a water meter at a certain time or the flow rate through the water meter since a previous data transmission (e.g. the sum $\Sigma$ of the time stampings TS$i$ corresponds to the sum $\Sigma$ of the flow volume; see FIG. 4).

The method may also consist in using the PA$j$ packets of raw measurement data to read and transmit the value of at least one other physical or physicochemical parameter PPC of the environment of the sensor 1 concerned or of the fluid measured by the latter at a given time, such as the conductivity of the fluid, the temperature of the fluid, the pH of the fluid, the pressure of the fluid, and/or a parameter characterizing the quality and/or the composition of the fluid and/or the temperature of the installation environment of sensor 1.

FIG. 3 shows the individual data telegrams 17$i$, 17$i$+1, ..., 17$i$+n according to FIG. 2 in somewhat more detail. The data telegrams 17$i$, 17$i$+1, ..., 17$i$+n each comprise a plurality of data packets PA1-PA6 or PA7-PA12, the absolute or cumulative value VA and the value of at least one other physical or physico-chemical parameter PPC of the environment of the respective sensor 1 or of the fluid measured by the latter at a certain time, such as the conductivity of the fluid, the temperature of the fluid, the pH of the fluid, the pressure of the fluid, a parameter characteristic of the quality and/or composition of the fluid and/or the temperature of the installation environment of sensor 1.

As shown as an example in FIG. 3, the compressed raw measurement data can be packed by formatting the PA$j$ packets, the size of which must not exceed a predetermined maximum value, whereby each time the accumulated data reaches the size of a packet PA$j$, a new packet or telegram is formed or a new transmission is triggered, provided that the predetermined time interval has not previously expired.

According to a preferred variant of the invention, the time stampings TS are compressed before being transferred. The time stampings TS can be compressed with no loss.

Alternatively, the time stamping TS compression can also be carried out with a specified permissible loss level. In fact, if the user or operator prefers to save energy and accepts a certain inaccuracy in the restoration and reproduction of the original measurement data (i.e. accepts a certain loss), the compression ratio may be increased to the detriment of less accuracy in the reproduction on the receiving side. This loss ratio or compression ratio can be provided as a programmable or adjustable parameter that determines or sets the compression mode.

As illustrative and non-restrictive examples of data compression algorithms, a differential coding (delta coding) in connection with a Huffman coding, a run length coding (RLE coding) or preferably an adaptive binary arithmetic coding (CABAC coding) can be considered within the framework of the inventive method.

Preferably, the time stampings TS in memory means 7 of consumption meter 10 are not deleted until the transmission of the time stampings TS has been confirmed by receiver or data collector 3.

Thanks to the invention, it is possible to have information at the data collector 3 or the receiving location (e.g. head-end 4) which enables a faithful and complete reconstruction from the time stampings TS which is true to the original of all raw measurement data supplied by the various sensors 1 in very high temporal resolution and allows unlimited flexibility in the evaluation of this data. In this way, the expandability of "business" functions can be easily and centrally taken into account without influencing the functionality or even the structure of modules (sensors, means of communication, and the like).

The design of the sensor 1 can be simpler and its operation more reliable than previously known solutions. Furthermore, the energy consumption of the assembly consisting of the sensor 1 and the communication means 2 is lower than in the current versions of consumption meters 10, which evaluate the data locally.

The expert understands of course that the invention can be applied to the measurement and remote reading of various parameters and sizes: It is sufficient to be able to accurately date an elementary change (measurable by sensor 1) of a parameter or a size in accordance with the resolution of the targeted sensor 1 (the time-stamped elementary variation can correspond to the resolution of the sensor or possibly a multiple of this resolution).

In connection with an advantageous application of the invention, associated with the concept of consumption, it may be provided that the or one of the measured physical quantity(s) refers to a flow medium, each time stamping corresponding to an elementary quantity of fluid which is measured by sensor 1, depending on its measuring accuracy. The measured fluid can be, for example, gas, water, fuel or a chemical substance.

Alternatively or cumulatively to the above mentioned variant, the invention may also provide that the or one of the measured physicochemical quantity(s) is selected from the group formed by the temperature, pH, conductivity and pressure of a fluid flowing through or contacted by the sensor 1 concerned.

If, alternatively or cumulatively, at least one parameter is measured, this or one of these measured physical or physico-chemical parameter(s) may be characteristic of the quality and/or composition of a fluid flowing through or coming into contact with the relevant sensor 1, such as turbidity, the presence of pollutants or the presence of a solid and/or gaseous fraction or solid and/or gaseous fractions.

The above sizes, units and parameters are, of course, only examples that are not restrictive.

With a 100% quality network, redundancy is not required. Therefore preferably the time stampings TS are transmitted without redundancy from the respective consumption meter 10 or sensor 1 to a data collector 3. This means that no repeated transmission of the raw measurement data is necessary. The advantage of this is that considerably less data has to be transmitted. However, if redundancy is required in the network, it may be achieved by sending the same data packet PAj or time stamping TS repeatedly in several successive transmissions.

Accordingly, data telegrams 17 are continuously formed at a certain point in time and successively transmitted. The individual data packets PA1, . . . , PAn then form a continuous time-stamped raw measurement data stream 13.

Figure 4:
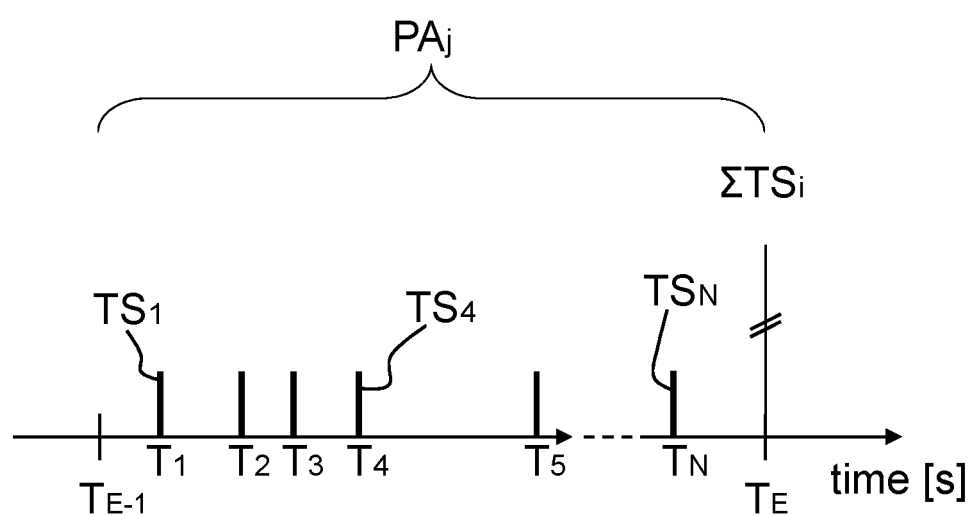
FIG. 4 is an example of a chronogram of time stampings of the raw measurement data read out by a sensor between two uplink transmission processes (messages or telegrams emitted at times TE-1 and TE), in a context of remote reading of the volume consumption (in this case, the package PAj contains N time stampings TSN)

FIG. 4 shows an example of a message structure transmitted from sensor 1 or consumption meter 10 to another transceiver, e.g. a data collector 3. Each time stamping TS1 to TSN corresponds according to the correlation model, for example, to an elementary quantity of fluid, which is measured by sensor 1, depending on its measuring accuracy. The measured fluid can be, for example, gas, water, fuel or a chemical substance. In the time interval TE-1 to TE, N pulses are measured and the time stampings TS1 to TSN are stored, which, with a quantity of, for example one liter per time stamping TS, corresponds to a total flow rate of N liters within this time interval. The measurement data processing unit 14 generates a data package PAj, which contains N time stampings TS1 to TSN. Data telegrams 17$i$, 17$i$+1 are formed according to FIG. 3 from the plurality of data packets, for example PA1 to PA6 or PA7 to PA12.

In order to adapt the procedure according to the invention to changes in the development of the parameter or the measured variable and at the same time to ensure a satisfactory update of the available instantaneous data, the procedure may advantageously consist, in particular, of forming a new packet or telegram or of carrying out a new data transmission in the form of a message or telegram as soon as at least one of the following two conditions is fulfilled:

(a) A predetermined time interval has elapsed; and
(b) a predetermined amount of compressed collected data or time stampings TS has been reached since the previous transmission.

The application of condition (b) may consist, for example, in periodically checking the size of all new data in compressed form or time stampings TS after a specified number of new raw measurement data has been read. If these sizes are close to a critical size, for example close to the size of a packet specified by the transmission protocol, a new transmission is performed (condition (b) is met before condition (a)) unless the specified time interval between two successive transmissions has expired first (condition (a) is met before condition (b)).

The method consists, therefore, preferably, if at least one of the conditions is fulfilled (they may exceptionally also be fulfilled simultaneously), in transmitting the compressed and formatted time stampings TS of each sensor 1 or consumption meter 10 concerned to the next transceiver, e.g. a data collector 3. A data collector 3, for example, manages a local network of a plurality of consumption meters 10 or sensors 1 assigned to it. From a data collector 3, the compressed and formatted time stampings TS together with the compressed and formatted time stampings TS of each of the other consumption meters 10 or sensors 1 that are part of the supply network are transmitted to the head-end 4.

The data collector 3 can store the time stampings TS retrieved from the respective sensors 1 and/or consumption meters 10 either over a time interval (e.g. one day) and then forward it to a processing location or to the head-end 4. Alternatively, the data can also be transferred immediately from the data collector 3 to the head-end 4.

Figure 5:
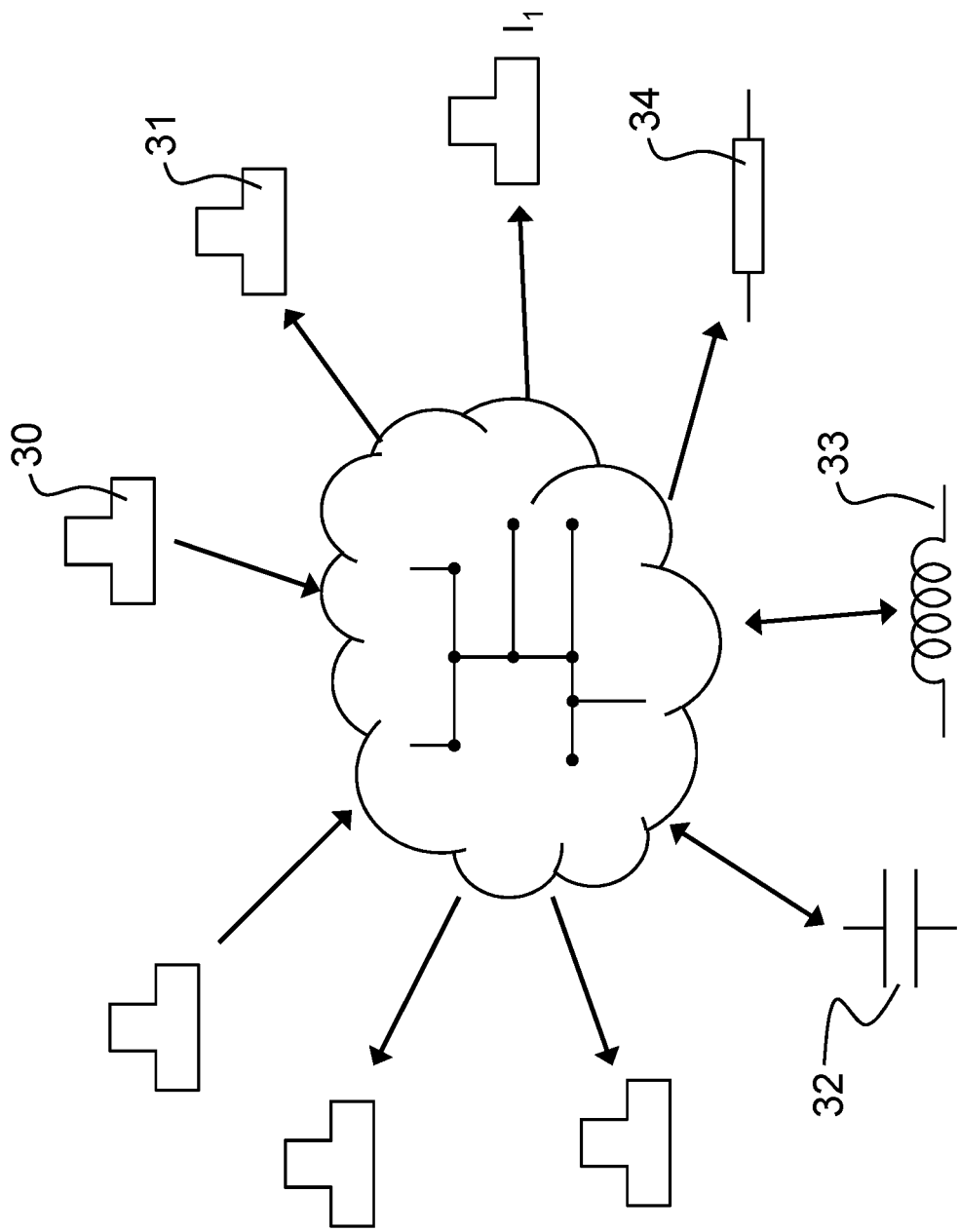
FIG. 5 is a very simplified schematic representation of a network (in this case, for example, a water network) with various inflows and outflows.

In FIG. 5 a snapshot of the network is shown. The network can be, for example, a water network with several inflows 31 and outflows 30. The outflow 30 could also be configured as an endpoint, such as a sensor 1 and/or a consumption meter 10. Each sensor 1 and/or consumption meter 10 is provided with an individual index Ii. At the outflow 30 the flow rate I is greater than zero by convention (Iout>0). The inflow 31 provides water to the system or respectively to the network. By convention, the flow rate I at an inflow 31 is less than zero (Iin<0). The network further contains a buffer vessel 32. The task of the buffer vessel 32 includes supply or storage of the distribution product, in this case e.g. water. In addition, fluctuations in the distribution product can occur in the network. In the case of water as a distribution product, this can have an effect, for example, in the form of pressure fluctuations 33. Due to pressure fluctuations 33, parameters of the system or respectively the network may change. Furthermore leaks 34 can occur in the network. The flow rate I of a leakage 34 is greater than zero by convention (Ileak>0).

At the time $T_0$ a snapshot of the network is taken, in order to determine the index of an individual sensor 1 and/or consumption meter 10. The index of an individual sensor 1 and/or consumption meter 10 at the time $T_0$ is given as $Ii,T_0$. Moreover at a given time $T_0$, the known index of the consumption meter 10 is $Ii,T_0+\partial T_0$ where $\delta T_0$ is the closest previous period of time. The decomposition at the first order for index extrapolation is given as $Ii,T_0=Ii,T_0+\delta T_0+\partial Ii/\partial t|(T_0+\delta T_0)*\delta T_0$. At the time $T_1$ an additional snapshot of the network is taken. The index extrapolation at the time $T_1$ is given as $Ii,T_1=Ii,T_1+\delta T_1+\partial Ii/\partial t|(T_1+\delta T_1)*\delta T_1$. To determine the consumption throughout the system, in particular water consumption during the time period $\Delta T$ from $T_0$ to $T_1$ the volume can be calculated as $Vi,\Delta T=Ii,T_1+\delta T_1-Ii,T_0+\delta T_0+[\partial Ii/\partial t|(T_1+\delta T_1)*\delta T_1-\partial Ii/\partial t|(T_0+\delta T_0)*T_0]$, whereas $\Delta T=T_1-T_0$. By convention, a volume value greater than zero $(Vi,\Delta T>0)$ provides water to the system; a volume value smaller than zero $(Vi,\Delta T<0)$ gets water out of the system, for instance by a consumption meter 10 or domestic meter at an end point 30. According to the continuity equation $\Sigma i\ Vi=0$, the sum of all inflows and outflows to and from the network is zero. The signs of inflows and outflows must be considered in accordance with the convention, so that, for example, a leak gives a negative contribution to the sum.

In FIG. 6 the relation between $T_0$ and $T_1$ is shown. The infinitesimal time intervals $\delta T_0$ and $\delta T_1$ are used for index extrapolation. In order to extrapolate the current value of $Ii,T_0$ or respectively $Ii,T_1$ the intervals $\delta T_0$ and $\delta T_1$ need to be infinitesimal ($\delta T \ll 1$). The claim that a previous measured value is infinitesimal before the current measured value is not fulfilled by the state of the art. This requires high temporal accuracy or granularity, which is what this invention offers. Therefore, a more accurate extrapolated index may be provided due to the use of time stampings TS.

FIGS. 7A-C show different network configuration. FIG. 7A shows a centralized network with one central node from which all other nodes are served. The decentralized network shown in FIG. 7B does not have one central node but several nodes with equal rights. In the distributed network or mesh network shown in FIG. 7C the infrastructure nodes connect directly, dynamically and non-hierarchically to as many other nodes as possible. The method of the present invention can be applied to every network configuration.

Figure 8:
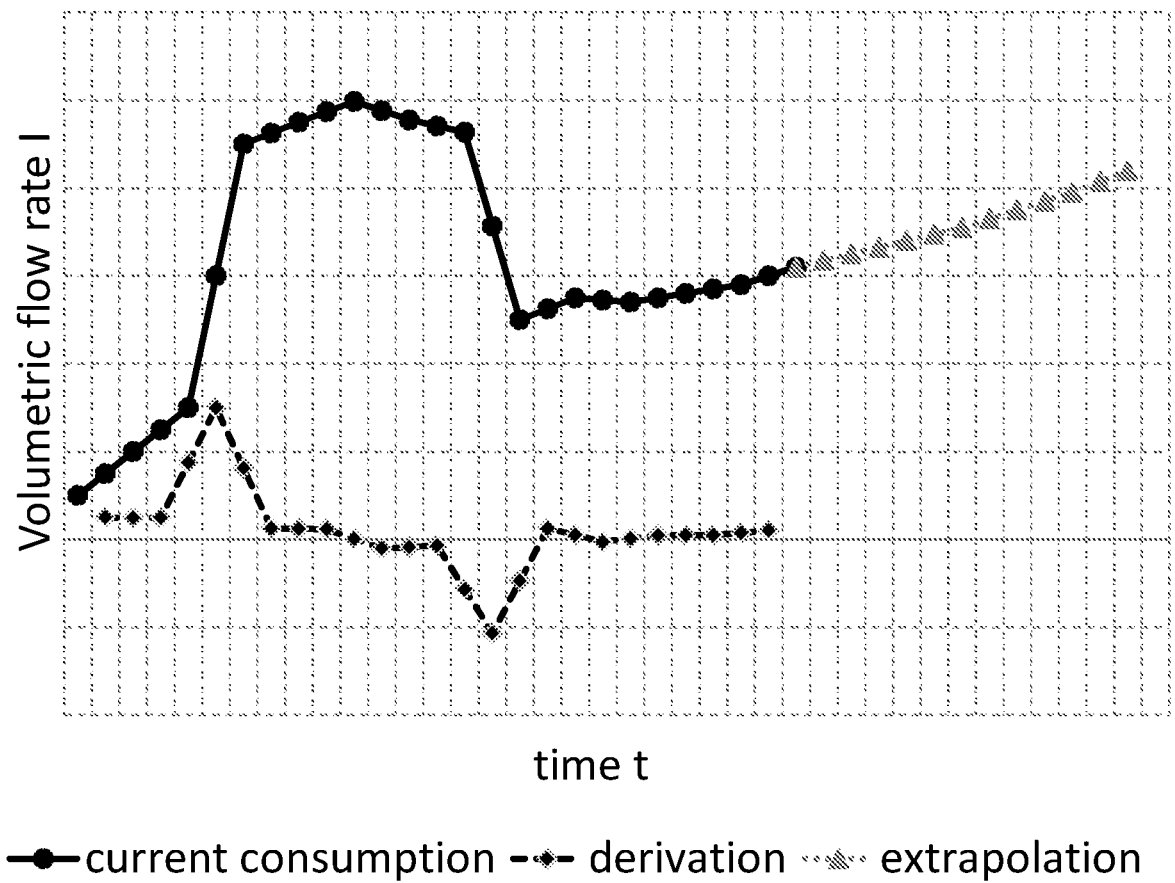
FIG. 8 is a diagram showing a current consumption, derivation and extrapolation of the consumption.

FIG. 8 shows the current consumption in the network as flow rate I over time t. The time derivative of the current consumption is also shown. Based on the current consumption and the time derivative, an extrapolation of the current consumption can be calculated. For example, consumption has increased for the last six values drawn, so that this increase can be extrapolated further.

Figure 9:
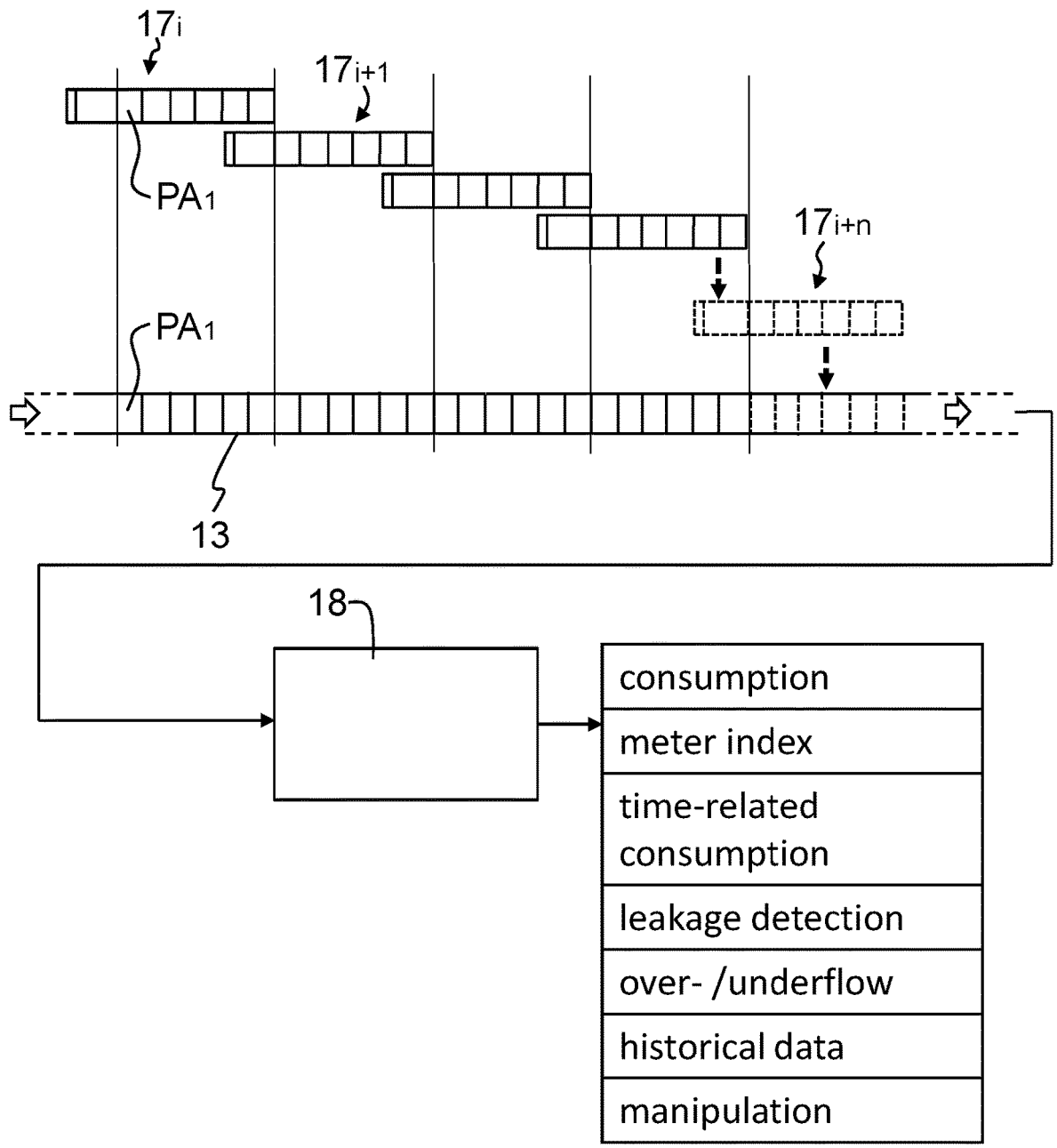
FIG. 9 is an example for the combination of the data packets or messages or telegrams or reconstructions containing the time stampings into a continuous stream of raw measurement data including its evaluation options in a highly simplified schematic representation.

FIG. 9 shows the further processing of the individual time stampings TS provided in data telegrams $17_i$-$17_{i+n}$ to a continuous coherent assignment from which a gapless raw measurement data stream 13 can be constructed using the correlation model. Here the individual data telegrams $17_i$-$17_{i+n}$ are combined in such a way that the respective data or data packets $PA_j$ or time stampings TS contained therein are combined in time relation with the adjacent data packets.

By the invention-based collection of raw measurement data supplied by the sensors 1 or consumption meters 10 of the or a specific network, the invention enables all types of evaluation, analysis, verification, monitoring and generally useful or desired processing and utilization, since the basic individual raw information is available. The evaluation of the provided raw measurement data is preferably carried out in the area of the head-end 4 via evaluation means 18 and results in a large amount of important information which is necessary for the management of the supply network but which could not yet be generated, e.g. consumption, meter index, time-related consumption, leakage detection, overflow/underflow, historical data and/or manipulation. This means that information can be retrieved retrospectively and without time gaps at any time and used for a previous evaluation.

In the head-end 4, the reconstructed raw measurement data are available in very high resolution or granularity without time gaps. As a result, in contrast to previous known procedures, there is much more usable data available in the head-end 4 due to the invention-based procedure.

The raw measurement data stream 13 in the head-end 4 preferably has a resolution in the second range, tenth of a second range, hundredth of a second range or thousandth of a second range.

The object of the invention is also, as schematically shown in FIG. 1, a supply network for the distribution of, in particular, fluid consumable goods using appropriately prepared consumption meters 10, which are operated in the supply network. The respective consumption meter 10 contains, see FIG. 2, at least one sensor 1, which can acquire raw measurement data via a measuring element. Furthermore, the respective consumption meter 10 contains a measurement data processing unit 14, which contains a microprocessor 8, memory means 7 and a time reference device 15. In the measurement data processing unit 14, the raw measurement data is time-stamped, the time-stamped raw measurement data is compressed and prepared in a format that is suitable for transmission via a radio link 11 or via the primary communication path 5 according to a specific protocol.

The consumption meter 10 can include its own power supply (not shown) in the form of a battery or the like if required. This means that the consumption meter 10 can be operated in an energy self-sufficient manner.

In the area of the head end 4, evaluation means 18 are provided which are able to combine the individual data telegrams $17i$-$17i$+n or their data packets $PAj$, which are designed as chronograms, continuously in time and without gaps to a continuous uninterrupted raw measurement data stream 13 and to perform corresponding decompressions, evaluations, calculations and the like from there. The corresponding data preferably include all consumption meters 10 in the supply network.

In addition, for the area concerned or for each geographical area in which the consumption meters 10 are installed, the above system contains a fixed data collector 3 (concentrator) forming a primary communication path 5 of the supply network with the consumption meters 10 of the area allocated to it. The primary communication path 5 can, for example, be designed as radio link 11. The data collector 3 is in turn connected to the head-end 4 via a tertiary communication path 6. The data can be transmitted along the tertiary communication path 6 in different ways, for example via LAN, GPRS, LTE, 3G, etc.

Preferably, the memory means 7 of each sensor 1 or consumption meter 10 form a buffer memory and are suitable and adapted to store the contents of several PAj packets of time stampings TS, especially in compressed state, the contents or part of the contents of this buffer memory being transmitted at each transmission or retrieval by the data collector 3.

The information collected by each data collector 3 is transmitted directly or indirectly to the head-end 4. The "Business" functions are also defined and executed there.

Figure 10:
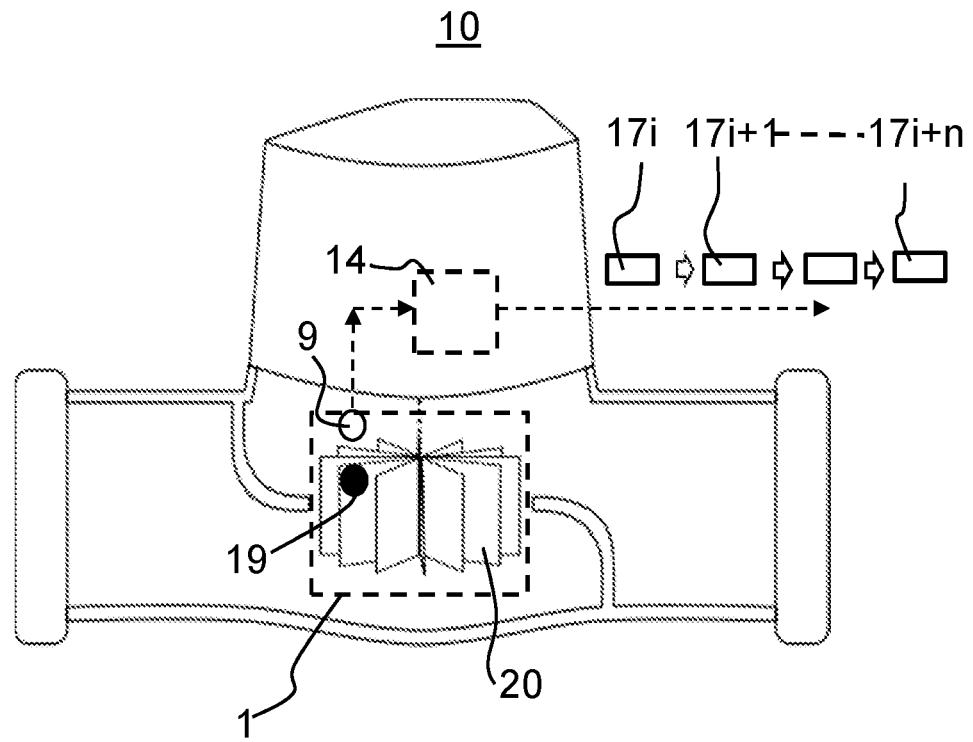
FIG. 10 is an illustration of a sensor of a consumption meter in the form of a mechanical flow meter with an impeller, with which corresponding raw measurement data for the flow rate can be generated.

FIG. 10 shows an example of a mechanical flow meter 10 with a sensor 1 for the flow rate. The sensor 1 contains an impeller 20, a measuring element 9 in the form, for example, of a Hall sensor and a pulse generator element 19, which rotates more of less depending on the flow through the flow meter 10. The rotation of the impeller 20 is detected by the measuring element 9 as a voltage value, which is excited by the pulse generator element 19, when the relevant blade of the impeller 20 is in the position of the measuring element 9. One revolution of the impeller 20 therefore corresponds to a certain flow volume, e.g. one liter of fluid.

Figure 11:
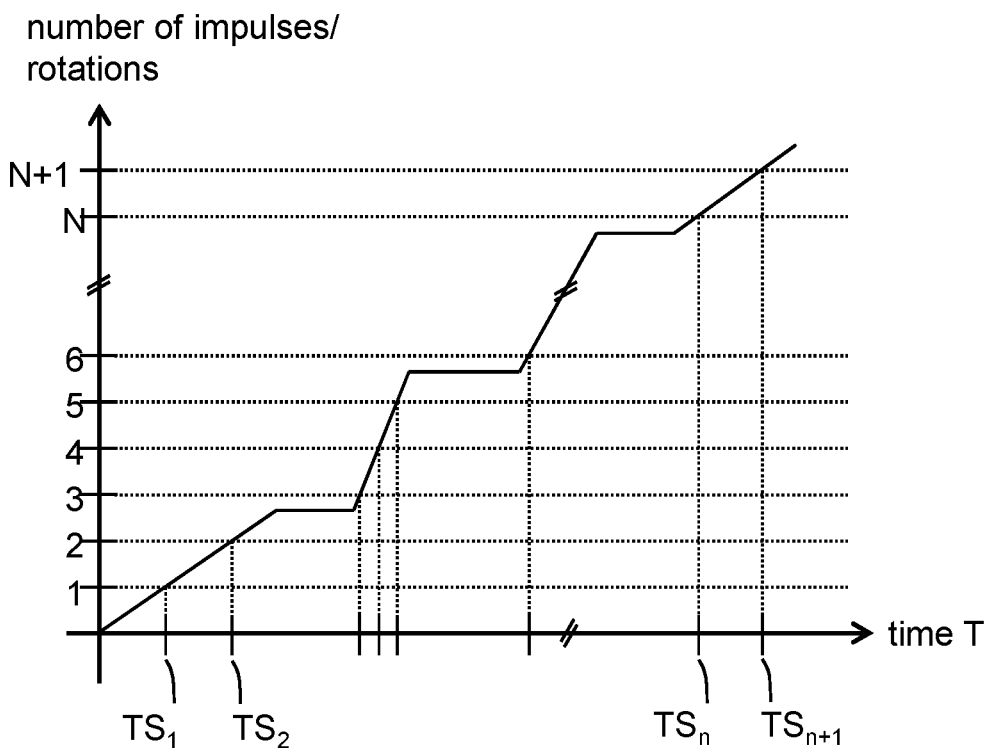
FIG. 11 is an illustration of a correlation model for generating time stampings on the basis of the raw measurement data recorded by the sensor according to FIG. 10.

In the measurement data processing unit 14 a correlation model is stored, with which the conditions for generating time stampings for certain raw measurement values have been defined beforehand. FIG. 11 shows a simplified example of such a correlation model, for example for a continuous cumulative flow measurement. The measurement unit is for example a pulse recorded by the measuring element 9 of the sensor 1 shown in FIG. 10, e. g. a voltage pulse, which corresponds to one rotation of the impeller 20. Therefore, the predefined resolution of the measurement method corresponds to one rotation of the impeller 20. The raw measurement values which are the triggered pulses by the rotations and the corresponding times T are stored in the memory means 7 of the sensor 1. The measurement data processing unit 14 generates for every raw measurement value (i.e. for each revolution/impulse) a corresponding time stamping TS1, TS2 bis TSn+1. The time stampings TS are continuously stored in the storage media 7. If the impeller 20 is not rotating, no impulse is generated and therefore no time stamping is performed. If the impeller 20 is moving slower, the time of acquisition of the pulse along the time axis T is correspondingly later. Accordingly, in this case a later time stamping TS is generated. As shown in FIG. 11 a plurality of time stampings TS are generated, which define the flow rate measured continuously over the period in question.

The time stampings TS are combined according to FIG. 2 in data packages PAj and successively transferred as data telegrams 17i, 17i+1, 17i+n over the primary communication path 5 to the data collector 3. The data transfer can preferably take place in compressed form. It is therefore a continuous, uninterrupted time stamping stream of data of very high resolution, which is transmitted in the form of the individual continuous data telegrams 17i, 17i+1, . . . , 17i+n along the primary communication path 5.

Figure 12:
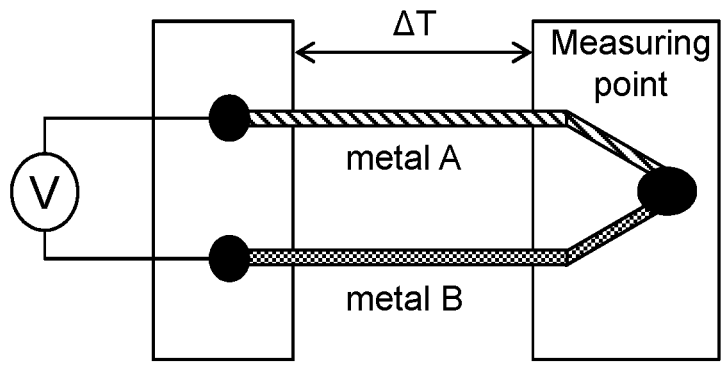
FIG. 12 is an illustration of a temperature sensor in a simple representation.

The collection of data is not limited to a flow measurement. FIG. 12 shows for example a sensor 1 in the form of a temperature sensor based on resistance measurement. The temperature sensor contains two metal conductors (A, B) with different thermal conductivity connected to each other in the area of a measuring point. In the event of a temperature difference ΔT between the measuring point and the opposite end of the two conductors, a voltage V or voltage change can be measured. In this case a time stamping TS for a change in the voltage measured by the sensor 1 can be determined as a correlation model.

Figure 13:
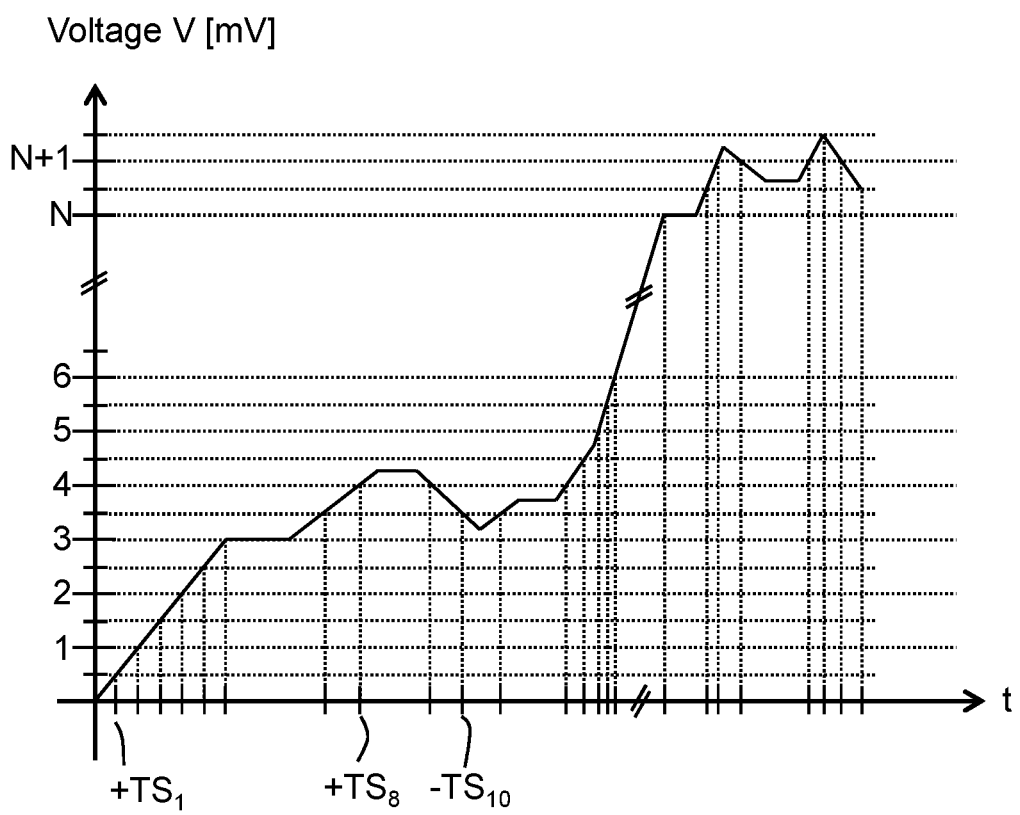
FIG. 13 is a correlation model for generating time stampings on the basis of the raw measurement data recorded by the sensor according to FIG. 12.

FIG. 13 show an example of a corresponding raw measurement data curve of voltage values V for generating corresponding time stampings TS at a temperature measurement. Accordingly, each time the voltage rises or falls, e.g. by 0.5 mV, a corresponding time stamping TS is generated. In this case, the determined resolution of the method is therefore 0.5 mV. Since the curve can be ascending or descending for a temperature measurement, the time stampings TS are signed with "+" for ascending or "−" for descending. As can be seen from FIG. 13, a continuous sequence of time stampings TS is also obtained here which represent the measured voltage curve and thus the temperature very accurately and without gaps over the period under consideration. If the temperature i.e. the voltage V does not change, no time stamping TS is generated. Furthermore, the procedure corresponds to the measures described in connection with the example of flow measurement described above.

Figure 14:
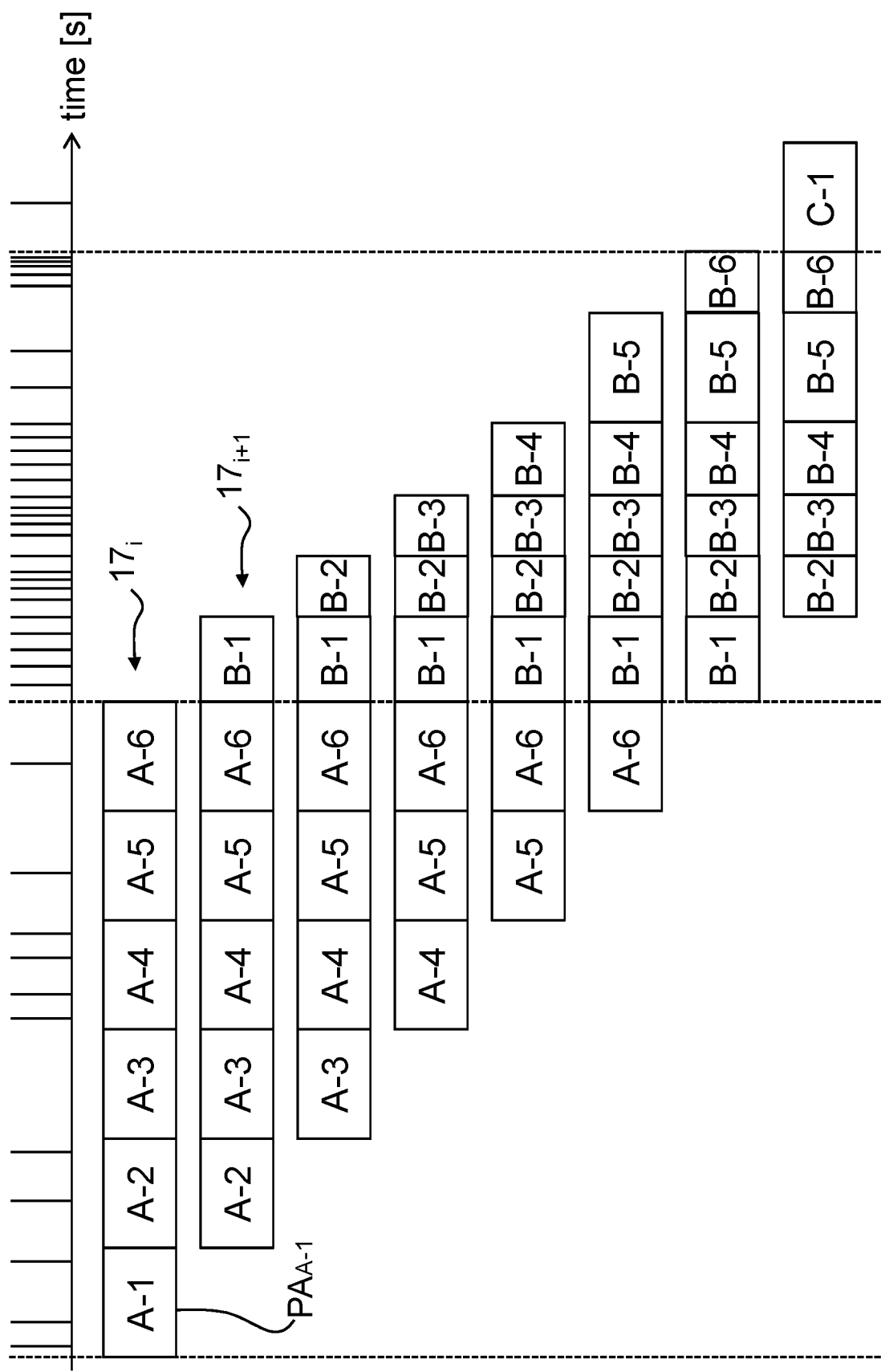
FIG. 14 is an illustration of a redundant transmission of PAj data packets.

FIG. 14 shows how redundancy in transmission can be achieved by repeated transmission of the same PAj data packet through several successive transmission processes. The time stampings TS are drawn on the time scale. The time stampings TS are packed by formatting into data packets PAj of predetermined fixed size. A data packet PAj is transferred as soon as either a specified time interval has elapsed or the accumulated time stampings TS reach the maximum size of a data packet PAj. In FIG. 14, the maximum size of a data packet PAj is shown as an example with five time stampings TS. In FIG. 14, the data packets PAA-1 to PAA-6 as well as PAB-5 and PAC-1 contain less than five time stampings TS, so that the transmission of these data packets PAj is triggered by the expiry of the specified time intervals. For the data packets PAB-1 to PAB-4 and PAB-6, the transmission was triggered by reaching the maximum size of the data packet PAj.

Any raw measurement data can thus be sampled using the method according to the invention. The time stampings TS may in particular refer to points in time or time differences. Preferably a start time is defined.

Of course, the invention is not limited to the designs described and depicted in the attached drawings. Changes remain possible, in particular with regard to the procurement of the various elements or by technical equivalents, without thereby leaving the scope of protection of the invention. The object of disclosure expressly includes combinations of sub-characteristics or sub-groups of characteristics among themselves.

The following is a summary list of reference numerals and the corresponding structure used in the above description of the invention:
 1 sensor
 2 communication means
 3 data collector
 4 head end
 5 primary communication path
 6 tertiary communication path
 7 memory means
 8 microprocessor
 9 measuring element
 10 consumption meter
 11 radio link
 12 remote central processing facility
 13 raw measurement data stream
 14 measurement data processing unit
 15 time reference device
 16 supply line
 17 data telegram
 18 evaluation means
 19 pulse generator element
 20 impeller
 22/23 ultrasonic transducer elements
 24 ultrasonic measuring section
 30 end point/outflow
 31 inflow
 32 buffer vessel
 33 pressure fluctuation
 34 leakage
 PAj data packet
 TS time stamping

The invention claimed is:

1. A method for collecting data in a network having at least one consumption meter with a local sensor and the network being a supply network distributing a consumable good, the local sensor having at least one measuring element, a wired and/or radio communication means and a memory, which comprises the steps of:
  providing, via the at least one measuring element, elementary measuring units in a form of raw measurement data corresponding to at least one physical or physicochemical value or at least one physical or physicochemical parameter;
  determining in advance, conditions for generating time stampings using a correlation model for a determination of a measurement resolution of the local sensor;
  generating, on a basis of the correlation model, the time stampings of successive raw measurement data in the local sensor;
  storing the time stampings in the memory of the local sensor;
  transmitting the time stampings over the wired and/or the radio communication means so that on a basis of the time stampings using the correlation model the raw measurement data collected by the at least one measuring element are reconstructed and evaluated; and
  using the raw measurement data for network monitoring.

2. The method according to claim 1, which further comprises:
  connecting the local sensor to a data collector via a primary communication path;
  providing a tertiary communication path between the data collector and a head end; and collecting, storing and/or evaluating the time stampings transmitted by the local sensors, being one of a plurality of sensors, in the data collector and/or in the head end.

3. The method according to claim 1, wherein:

within a framework of the correlation model a certain value, a certain change in value or a certain difference in value of the at least one physical or physicochemical value or the at least one physical or physicochemical parameter is determined for an assignment of a time stamping; and on recording of the certain value, the certain change in value or the certain difference in value by the at least one measuring element the time stamping is triggered and stored in the memory of the local sensor.

4. The method according to claim 1, wherein within a framework of the correlation model a stepwise or incremental increasing meter reading and/or a table of values is represented by time stampings.

5. The method according to claim 1, wherein the time stampings have a sign.

6. The method according to claim 1, wherein for reconstructing and evaluating the raw measurement data collected by the at least one measuring element a basic index of the local sensor and the time stampings indicating an incremental increase and/or decrease of an index are transmitted.

7. The method according to claim 2, which further comprises transmitting a number of the time stampings over the primary communication path as a data packet or as a data telegram.

8. The method according to claim 7, wherein after receiving data packets or data telegrams, the data packets or the data telegrams are reassembled in an appropriate time sequence reference.

9. The method according to claim 2, wherein on a basis of the time stampings received by the data collector and/or the head-end using the correlation model, a raw measurement data stream is generated.

10. The method according to claim 1, wherein the network monitoring takes place during live operation.

11. The method according to claim 10, wherein the network monitoring includes load-dependent network restructuring.

12. The method according to claim 1, which further comprises determining a consumption signature for the local sensor being one of a plurality of sensors.

13. The method according to claim 12, which further comprises using the consumption signature to identify a potential metering failure.

14. The method according to claim 1, wherein a configuration of the local sensor and/or a line section is determined on a basis of a current consumption in the network.

15. The method according to claim 1, which further comprises performing a sensor consumption profile analysis for diagnosis of the network.

16. The method according to claim 1, which further comprises taking a snapshot of the network at time $T_0$ to determine a current meter reading of the local sensor being one of a plurality of sensors.

17. The method according to claim 16, wherein the snapshot of the network at time $T_1$ is taken to determine a consumption in a time interval from time $T_0$ to time $T_1$.

18. The method according to claim 17, wherein a time derivative of a current consumption value is formed to extrapolate the consumption.

19. The method according to claim 1, wherein the network monitoring and evaluation of the raw measurement data takes place in a remote central processing plant.

20. The method according to claim 9, wherein the raw measurement data stream can be evaluated without time gaps in a data processing sequence apart from the measurement resolution of the local sensor on a time-historical basis.

21. The method according to claim 1, wherein an elementary measuring unit of the elementary measuring units refers to an electric voltage or to an electric current.

22. The method according to claim 1, wherein a measured physical quantity refers to a supply medium of the supply network.

23. The method according to claim 1, wherein a measured physical or chemical-physical parameter(s) is/are characteristic of a quantity, a quality and/or composition of a fluid flowing through or contacted by the local sensor.

24. The method according to claim 1, wherein the at least one elementary measuring element generates a time stamping, when the at least one elementary measuring element receives a pulse.

25. The method according to claim 1, which further comprises executing a new data transmission in a form of a message or a telegram as soon as at least one of two conditions is met:
   (b) expiration of a specified time interval; and
   (c) achieving a specified amount of the time stampings since a previous transmission.

26. The method according to claim 1, which further comprises packaging the time stampings by formatting it into data packets of a predetermined fixed size, wherein each time accumulated data reaches a size of a data packet or a predetermined time interval has expired, a new transmission is triggered.

27. The method according to claim 1, which further comprises carrying out a data transmission with redundancy.

28. The method according to claim 27, wherein a redundancy in the data transmission is achieved by repeated transmission of a same data packet in several successive transmission processes.

29. The method according to claim 27, wherein a redundancy in the data transmission is achieved by repeated transmission of a same time stamping.

30. The method according to claim 1, which further comprises transferring the time stampings in compressed form.

31. The method according to claim 30, wherein a compression of the time stampings is performed without loss.

32. A sensor configured to operate the method according to claim 1.

33. A consumption meter, comprising:
   a local sensor having at least one measuring element, a wired and/or radio communication means and a memory, wherein the consumption meter is operable according to the method in accordance with claim 1.

34. A data collector configured to be operable according to the method in accordance with claim 1.

35. A network where raw measurement data are used for network monitoring, the network is configured to be operable according to the method of claim 1.

* * * * *